United States Patent [19]

Fusey

[11] 3,900,421

[45] Aug. 19, 1975

[54] METHOD OF ACCELERATING THE BIODEGRADATION OF PETROLEUM PRODUCTS

[75] Inventor: Pierre Fusey, Paris, France

[73] Assignee: Societe Anonyme: Banque pour l'Expansion Industrielle "Banexi", Paris, France

[22] Filed: Feb. 13, 1973

[21] Appl. No.: 332,088

[30] Foreign Application Priority Data

Feb. 22, 1972 France .............................. 72.05894

[52] U.S. Cl. ............. 252/312; 71/25; 210/DIG. 21; 252/352; 252/354; 252/356; 252/DIG. 1; 252/DIG. 6; 252/DIG. 14

[51] Int. Cl.² .......................................... B01J 13/00

[58] Field of Search ...... 252/354, 356, 352, DIG. 6, 252/312; 210/DIG. 21

[56] References Cited

UNITED STATES PATENTS

| | | | |
|---|---|---|---|
| 2,296,933 | 9/1942 | Jordan | 252/356 X |
| 2,531,190 | 11/1950 | Ackelsberg | 252/356 |
| 3,257,331 | 6/1966 | Jameston et al. | 252/356 X |
| 3,625,857 | 12/1971 | Weimer et al. | 252/312 |
| 3,714,063 | 1/1973 | Salomone | 252/352 X |

Primary Examiner—Richard D. Lovering
Attorney, Agent, or Firm—Young & Thompson

[57] ABSTRACT

The present invention concerns the elimination of mineral oil, especially petroleum products by biological degradation. A composition is formed substantially by a phospho-amino-lipid mixed with a nontoxic and entirely biodegradable emulsifier, the phosphoaminolipid being preferably lecithin. This composition may be used in liquid form for spraying floating oil-slicks and for cleaning tanks for mineral oil products and it may be brought into the form of a paste or powder by addition of mineral charges.

2 Claims, No Drawings

METHOD OF ACCELERATING THE BIODEGRADATION OF PETROLEUM PRODUCTS

The present invention relates to bringing mineral oil, especially petroleum products into the form of a biodegradable emulsion.

Compositions have already been proposed for bringing mineral oil products into the form of a biodegradable emulsion, these compositions having a base of organic substances capable of supplying micro-organisms such as carbohydrates or hydrophilic polypeptides in the form of molasses, various residual wash liquors (vinasses), casein, etc., together with emulsifying agents or various chemical substances such as mineral or organic acids or the alkali or alkaline earth metal salts thereof. These compositions give stable emulsions and they are perfectly biodegradable, particularly when the biodegradation is effected in a closed medium.

In fact, in order to be biodegradable, an emulsion of mineral oil, especially petroleum products must not be toxic and it must contain sources of carbon, nitrogen and phosphorus in sufficient quantity to ensure, for the micro-organisms, the elements necessary for the constitution of living matter. The biodegradation of mineral oil products results from the use, by the micro-organisms, of the hydrocarbons as a source of carbon and it is necessary that the composition used for emulsifying should contain considerable sources of nitrogen and sources of phosphorus in a smaller quantity. These sources of nitrogen and phosphorus exist in previously proposed compositions, but the emulsion is made via the intermediary of oleophilic agents which are water-soluble in which nitrogenous or phosphorus elements are not closely bound to the hydrocarbon molecules. In every case the nitrogenous and phosphorus elements are dispersed in the dilute emulsion. If this dilution is contained as in the case of biodegradation effected in a tank or the like, for example, for a biodegradation intended to transform the hydrocarbons into fertilising materials or in the case of the use of the emulsion as a culture medium for the micro-organisms, said micro-organisms find the nitrogenous and phosphated elements within their immediate reach. On the other hand, in the case of very extensive dilution, for example in the case of discarded material discharged into the river or sea, the content of nitrogen and phosphorus in the medium surrounding the hydrocarbon molecules is insufficient to permit the growth of micro-organisms.

The present invention has the object of minimizing these disadvantages and it relates to the elimination of mineral oil products by biological degradation by the use of a composition which is formed substantially by a phospho-amino-lipid mixed with a non-toxic and entirely biodegradable emulsifier.

The phospho-amino-lipid ensures the supply of nitrogen and phosphorus and it can be enriched with nitrogen by addition of amino-lipids. These lipids have the advantage of being soluble in hydrocarbons and insoluble in water.

In practice lecithin is used as phospho-amino-lipid and the amino-lipid is preferably 11-amino-undecanoic acid.

The non-toxic and entirely biodegradable emulsifier, may be selected from sodium oleylisethionate, sodium methylaminoethane sulphonate, sodium laurylsulphate, sulphonated secondary paraffins, sulphonated alpha-olefins, sarcosinates, 2-amino-2-hydroxymethyl-1,3-propanediol, aminomethylpropanol, certain ethoxylated fatty alcohols, polyoxyethyleneglycol oleate, etc.

If desired, the composition may contain other biodegradable organic bodies, in particular organic acids such as lactic acid which simultaneously represents a vehicle for bringing into solution 11-amino-undecanoic acid, amino acids such as glutamic acid, glycocoll, tyrosine, leucine, proline, lysine, valine, betaine, histidine, alanine or amino acid sources such as vinasses and casein, fatty acids such as caproic, octoic, caprylic, oleic acids.

The composition may be brought into liquid form, in particular so as to be atomised or applied through a nozzle by addition of water or of a solvent more compatible than water with the hydrocarbons but deprived of toxic action such as propylene glycol, di-propylene glycol and petroleum solvents deprived of aromatic fractions. It may also be brought into the form of a paste or a powder by addition of mineral charges such as calcium phosphate, calcium carbonate or zinc oxide. It is preferable that part of the mineral charges is formed by a metal oxide.

Various examples for carrying the invention into practice will be described hereinafter, the percentages given in these examples being parts by weight.

EXAMPLE 1

Five parts of 11-amino-undecanoic acid are dissolved in 15 parts of lactic acid, then ten parts of emulsifier are added, formed by an ethoxylated (50E) fatty alcohol (C10–12), 2 parts of soya lecithin and 68 parts of water.

The liquid composition obtained was used for emulsifying crude oil (petroleum) in a ratio of 30 parts of composition to 100 parts of crude oil and sludge oils in a ratio of 35 parts of composition to 100 parts of sludge oil.

The emulsions were poured into tanks representing marine ecological micro-media. They remained in the form of fine emulsions in the upper parts of the tanks without modifying the development of the fauna and flora.

Biodegradation was observed by chromatography in a gaseous phase. The speed of degradation varied as a function of the various factors such as temperature, aeration, natural richness of the medium in micro-organisms, etc. Comparison with reference tanks show that it was at least twenty times faster than natural biodegradation. Under conditions corresponding to temperate seas, it was completed within one to three months.

EXAMPLE 2

Added to 5 parts of soya lecithin, were, as emulsifier, 15 parts of ethoxylated fatty acid, then dilution was effected with 80 parts of water. 20 grams of this composition were sprayed on a crude oil slick of 100 gr. floating on the surface of a tank containing sea water, the surface of which was agitated. A fine emulsion was formed having the same characteristics of harmlessness and biodegradability as in Example 1.

EXAMPLE 3

A composition was prepared containing, in addition to 5 parts of lecithin, 6 parts of sulphonated alpha-olefin and 8 parts of ethoxylated fatty alcohol as emulsifiers, and 81 parts of water. The amount of this composition employed is 25 parts to 100 parts of crude oil and 30 parts to 100 parts of sludge oil or No. 2 heavy fuel.

EXAMPLE 4

3 parts of lecithin and 6 parts of an ethoxylated fatty alcohol were well mixed together forming an emulsifier, then 88 parts of water and three parts of sodium lauryl sulphate were added to the mixture with stirring forming an emulsifier. This composition, used in a ratio of 25 to 35 parts to 100 parts of mineral oil products gave, according to the nature thereof, similar results as in Example 1.

EXAMPLE 5

5 parts of lecithin, 4 parts of aminomethylpropanol and 87 parts of water were closely mixed together and then there was added 4 parts of sodium lauryl sulphate. This liquid composition was sprayed on an oil slick at the rate of 30 parts to 100 parts of mineral oil products.

EXAMPLE 6

2 parts of lecithin were mixed with 10 parts of octoic acid and then 4 parts of sulphonated alpha-olefin and 4 parts of an ethoxylated fatty alcohol were added as emulsifier and finally 68 parts of dipropylene glycol was added as solvent. 20 kg of the composition was poured into a tank containing 100 kg of petroleum deposits and the mixture was stirred and the walls brushed. The homogeneous mixture obtained was pumped and poured into a tank of water in which an emulsion formed. Progressive biodegradation of the emulsion was observed, the speed of biodegradation being similar to that of the emulsion in Example 1.

EXAMPLE 7

A composition was prepared, formed of 10 parts of lecithin, 40 parts of polyoxyethyleneglycol oleate and 50 parts of white spirit deprived of aromatic products. 100 parts of the residues of an oil tanker were stirred with 25 parts of this composition which immediately gave a mixture which was poured into a tank of sea water, the biodegradation of the emulsion being produced in the same manner as above.

EXAMPLE 8

A mixture of 20 parts lecithin, 40 parts of an ethoxylated fatty alcohol and 40 parts of water was prepared. This mixture was stored. When used, the mixture was diluted in a ratio of 100 parts of mixture to 100 parts of sea water and the diluted composition was sprayed onto an oil slick in a ratio of approximately 30 parts to 100 parts of oil. Similar results were obtained as in Example 2.

EXAMPLE 9

A mixture of 10 parts of lecithin, 20 parts of polyoxyethyleneglycol oleate, 20 parts of an ethoxylated fatty alcohol and 50 parts of dipropyleneglycol was prepared. For treating a fresh oil slick spread over a cement ground, 100 parts of the mixture were diluted with 100 parts of water, the slick was sprayed with the composition and brushed and then rinsed with water. The diluted emulsion was collected and used as aquarium water. The ground was perfectly clean, the fauna and flora in the aquarium showed no sign of degeneration and biodegradation was effected in approximately eight weeks.

EXAMPLE 10

A mixture was prepared containing 10 parts of lecithin, 30 parts of polyoxyethyleneglycol oleate and 60 parts of dipropylene glycol. At the time of use the composition was diluted weight for weight with water and used in the same manner as in Example 2 with similar results.

EXAMPLE 11

A mixture was prepared from 20 parts lecithin, 20 parts of polyoxyethyleneglycol oleate and 6 parts of calcium phosphate, 20 parts calcium carbonate and 34 parts water. The resultant paste was disposed in a line on a beach of white sand in a hydrographic research tank and mineral oil was poured into the tank spreading out into a slick. The oil slick was steered by the currents and the artificial swell towards the beach and the line of composition was driven by the waves to be mixed with the oil, resulting in an emulsion dispersed in the upper layers of the tank. The emulsion deposited on the sand was washed by the flow and no trace of soiling could be found on the sand. A duck allowed to swim in the tank showed no unusual behaviour nor could any adhesion of emulsion be found on its feathers.

EXAMPLE 12

8 parts of 11-amino-undecanoic acid were dissolved in 20 parts of lactic acid, then 2 parts lecithin, 100 parts of vinasses from the preparation of glutamic acid, 5 parts of 85% crude glutamic acid, 150 parts of water and 4 parts of sodium lauryl sulphate were added. This composition was used in the same manner as in Example 1 and gave similar results with appreciably the same speed of biodegradation.

EXAMPLE 13

50 parts of zinc oxide and 500 parts of calcium carbonate were added to a mixture of 10 parts of lecithin, 20 parts stearic acid, 30 parts of polyoxyethyleneglycol oleate and 30 parts of white spirit which yielded a powder. This powder was used to dust on an oil slick which resulted in a deposit and the disappearance of the oil slick. The biodegradation of the products contained in this deposit was observed by periodic sampling. Progressive and simultaneous biodegradation of the lecithin, of the stearic acid, the white spirit and the petroleum products, was observed, the consumption of the phosphorus and the nitrogen in the lecithin proceeding within the deposit in parallel with the biodegradation of the oil. The biodegradation was much more rapid than the very slow natural biodegradation of the oil carried along with the powdered chalk, a feature attributed to the presence within the deposit of a phospho-aminolipid and a metal oxide representing a source of oxygen.

The above methods, described merely by way of example, may be modified in many ways without departing from the scope of the present invention. It is to be noted, however, that in each of the examples the lecithin is present in an amount of one part by weight to one to five parts by weight of the emulsifier.

What is claimed is:

1. A method of accelerating the biodegradation of petroleum products, comprising mixing 100 parts by weight of the petroleum product to be biodegraded with about 30 parts by weight of a mixture of one part by weight of lecithin with one to five parts by weight of an emulsifier selected from the group consisting of sodium oleylisethionate, sodium laurylsulfate, sulphonated alpha-olefin, sarcosinate, 2-amino-2-hydroxymethyl-1, 3-propanediol, aminomethyl propanol, ethoxylated fatty acid, and ethoxylated fatty alcohol, and forming an emulsion of the mixture thus produced with water.

2. A method as claimed in claim 1, in which said emulsifier is polyoxyethyleneglycol oleate.

* * * * *